Sept. 1, 1964

T. GONZALEZ 3,147,175

ORNAMENTAL TREE

Filed May 10, 1961

INVENTOR.
TONY GONZALEZ

BY *Clark Ott*

ATTORNEYS

United States Patent Office 3,147,175
Patented Sept. 1, 1964

3,147,175
ORNAMENTAL TREE
Tony Gonzalez, 210 E. 96th St., New York, N.Y.
Filed May 10, 1961, Ser. No. 109,178
5 Claims. (Cl. 161—22)

This invention relates to a tree which is continuously ornamented by flocculent material dropping downwardly through the tree. An object of the invention is to provide means for producing a continuous circulation of the flocculent material upwardly through a flow passageway in the tree and the continuous downward discharge thereof at the top of the tree.

The tree may be of the character of a Christmas tree which is frequently decorated by white material simulating snow and while trees of this character have been coated with white material, the continuous discharge of flocculent material at the top thereof has not been a feature of such trees. The present invention therefore provides means for discharging flocculent material at the top of a tree, recovering the flocculent material which falls between the branches of the tree and repeating the discharging and recovering cycle.

Another object of the invention is to discharge the flocculent material by means of a motor driven blower having an air outlet adjacent the top of the tree and a suction inlet adjacent the bottom thereof for recovering the flocculent material falling downwardly through the tree.

Still another object of the invention is to discharge the flocculent material upwardly through the trunk of the tree and outwardly adjacent the top thereof and with a deflector mounted on the top of the tree for deflecting the discharged material downwardly.

Still another object of the invention is to provide a receptacle below the three having a suction inlet connected with the blower and with rotating means within the receptacle for moving the flocculent material towards the suction inlet.

With the foregoing and other objects in view, reference is now made to the following specification and accompanying drawings in which the preferred embodiment of the invention is illustrated.

Figure 1:
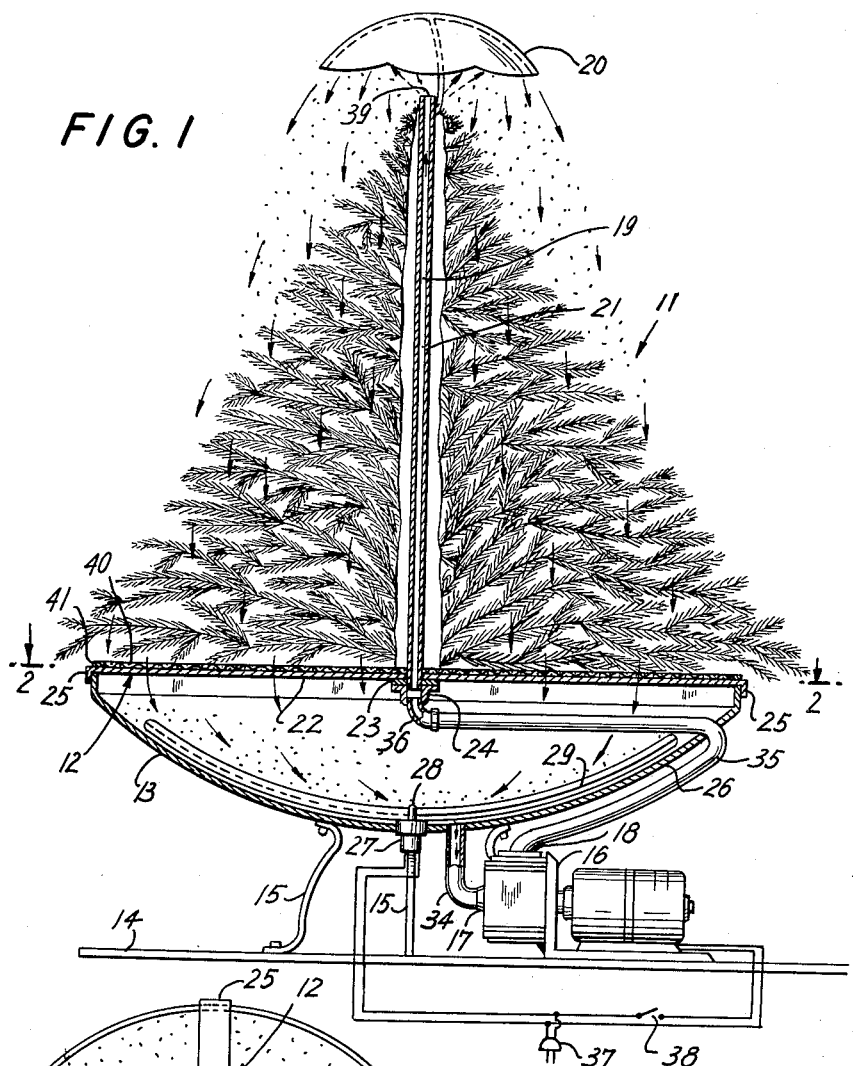
FIG. 1 is a view in elevation of a tree simulating a Christmas tree with parts shown in section and with means mounting the tree constructed in accordance with the invention.
Figure 2:
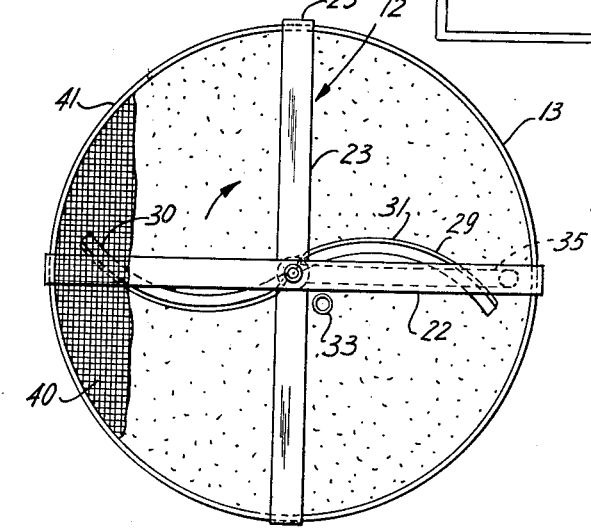
FIG. 2 is a transverse sectional view taken approximately on line 2—2 of FIG. 1.

The invention is shown in the drawings in its application to a pine tree 11 and the like which is generally used as a Christmas tree and is usually ornamented to portray the spirt of Christmas.

In the embodiment illustrated the tree is supported in upright relation on a frame 12 mounted on the upper edge of a receptacle 13 which is of a size to underly substantially the entire bottom area of the tree. The receptacle 13 is supported on a base 14 by means of feet 15 to dispose the receptacle in spaced relation above the base and with an electric motor driven blower 16 mounted on the base below the receptacle. The suction inlet 17 of the blower is connected with the receptacle and the outlet 18 thereof is connected with a flow passageway 19 for producing an intake of flocculent material from the receptacle and the discharge thereof at the top of the tree trunk. A deflector 20 is mounted on the top of the tree trunk above the outlet of the tree trunk for deflecting the flocculent material downwardly through the tree.

Some of the flocculent material will fall on the branches so as to decorate the same therewith, while the greater portion thereof will fall between the branches and into the receptacle so that the cycle of discharging the material at the top of the tree and recovering the same from the receptacle may be continuously repeated. For this purpose the tree trunk 21 may be of hollow formation containing the flow passageway 19. The trunk is affixed in any desired manner to the frame 12 and as illustrated the frame 12 consists of cross straps 22 and 23 of metal or other stiff material which cross below the tree and are secured together in any desired manner. A flanged tubular fitting 24 is secured to the frame and with the trunk threadedly secured in upright relation therein. The cross straps are provided with downturned terminal ends 25 which engage over the rim of the receptacle.

The receptacle 13 is formed with a concave bottom wall 26 and mounted on the underside thereof is an electric motor 27 having its armature shaft 28 protruding therethrough. A blade 29 is affixed to the inner end of the armature shaft for rotation of the blade within the receptacle in a clockwise direction. The blade 29 is formed with opposite portions 30 and 31 which are of arcuate formation in plan and in vertical section and are arranged adjacent to the bottom wall of the receptacle for moving the flocculent material inwardly toward a suction outlet 33. The suction outlet 33 is connected with the suction inlet 17 of the blower by means of a conduit 34 and the discharge outlet 18 of the blower has a conduit 35 connected with the fitting 24 by means of an elbow 36.

The blower may be of any desired construction and is preferably rotated by the motor at a speed of 3,500 r.p.m. while the armature of the electric motor 27 is preferably rotated at 30 r.p.m. The motors are preferably connected in parallel with an electric plug 37 for connection with a source of electric power and a switch 38 is interposed in the circuit for simultaneously energizing both motors.

The outlet 39 as the upper end of the tree trunk is directed upwardly so that the flocculent material is discharged against the concave underface of the deflector 20 whereby the flocculent material is deflected downwardly in the form of a shower. The tree may be artificial as illustrated or the same may be a natural tree and with the flow passageway 19 extending along the tree trunk. Affixed to the frame 12 in covering relation with the top of the receptacle 13 is a wide mesh screen 40 through which the flocculent material falls into the receptacle. The screen 40 is preferably formed with a frame 41 extending about the periphery thereof.

The flocculent material is preferably white but may be of any desired color, and is sufficiently light so that it will be drawn into the suction inlet of the blower when falling into the receptacle and the air drawn into the blower will carry the flocculent material in a stream through the blower and upwardly through the flow passageway 19 where it is discharged and falls as a shower through the tree.

While the preferred form of the invention is shown and described herein, it is to be understood that the same is not so limited but shall cover and include any and all modifications which fall within the purview of the invention.

What is claimed is:

1. In a device of the character described, a tree, an open top receptacle disposed below said tree, means carried by said receptacle mounting said tree in upright relation thereabove, a flow passageway extending longitudinally of the tree trunk having an open upper end adjacent the top of the tree, said receptacle having an opening in the bottom wall thereof, a motor driven blower adapted to be connected to a source of electrical power, conduit means connected with the opening in said receptacle and with the suction inlet of the blower, and conduit means connected with the outlet of the blower and with said flow passageway for producing a suction in the receptacle when the blower is in operation to thereby produce a flow of flocculent material from the receptacle and upwardly through the flow passageway which is discharged at the top thereof.

2. In a device of the character described as set forth in claim 1 in which the flow passageway is within the tree trunk which latter is of tubular formation.

3. In a device of the character described as set forth in claim 1 in which the bottom wall of the receptacle is of concave formation and the said opening therein is located substantially at the lowest portion of the bottom wall.

4. In a device of the character described, a tree, an open top receptacle disposed below said tree, means carried by said receptacle mounting said tree in upright relation thereabove, a flow passageway extending longitudinally of the tree trunk having an open upper end adjacent the top of the tree, a deflector mounted on the tree at the top thereof having a downwardly directed underface, said receptacle having an opening in the bottom wall thereof, a motor driven blower adapted to be connected to a source of electrical power, conduit means connected with the opening in said receptacle and with the suction inlet of the blower, and conduit means connected with the outlet of the blower and with said flow passageway for producing a suction in the receptacle when the blower is in operation to thereby produce a flow of flocculent material from the receptacle and upwardly through the flow passageway which is discharged at the top thereof against the underface of said deflector whereby the flocculent material is directed downwardly through the tree.

5. In a device of the character described, a tree having a trunk of tubular formation open at the top and providing a flow passageway, an open top receptacle disposed below said tree, means carried by said receptacle mounting said tree in upright relation thereabove, a deflector mounted on the tree at the top thereof and having a downwardly directed underface, said receptacle having a bottom wall with a concave upper face and an opening in the bottom wall adjacent the lowest portion thereof, an electric motor driven curved blade mounted for rotation in said receptacle adjacent the bottom wall thereof, an electric motor driven blower, conduit means connected with the opening in said receptacle and with the suction inlet of the blower, conduit means connected with the outlet of the blower with said flow passageway for producing a suction in the receptacle when the blower is in operation to thereby produce a flow of flocculent material from the receptacle and upwardly through the flow passageway which is discharged through the open end thereof against the underface of said deflector whereby the flocculent material is directed downwardly through the tree so as to decorate the tree with a coating thereof, and said blade functioning to move the flocculent material falling into said receptacle towards said opening in the receptacle when the blade is rotated, and means adapted to connect the motor of said blade and the motor of said blower to a source of current supply to energize said motors.

References Cited in the file of this patent
UNITED STATES PATENTS

| | | |
|---|---|---|
| 1,058,566 | Dunlap | Apr. 8, 1913 |
| 1,400,289 | Humphrey | Dec. 13, 1921 |
| 1,442,367 | Stevens | Jan. 16, 1923 |
| 2,324,787 | Lundgren | July 20, 1943 |
| 2,419,835 | Hester | Apr. 29, 1947 |
| 2,602,418 | Paasche | July 8, 1952 |
| 2,875,555 | Thiegs et al. | Mar. 3, 1959 |
| 3,007,282 | Galesky | Nov. 7, 1961 |
| 3,013,891 | Block | Dec. 19, 1961 |

OTHER REFERENCES

Landtechnische Forschung, Heft. 5, 1959, pp. 140–145.
Farm Implement and Machinery Review, Oct. 1, 1959, vol. 85, pp. 791, 792, "Artificial Snow as Frost Protection."